(12) United States Patent
Guo et al.

(10) Patent No.: US 9,691,354 B2
(45) Date of Patent: Jun. 27, 2017

(54) DISPLAY DRIVING METHOD AND DISPLAY DRIVING DEVICE

(71) Applicants: BOE TECHNOLOGY GROUP CO., LTD., Beijing (CN); BEIJING BOE OPTOELECTRONICS TECHNOLOGY CO., LTD., Beijing (CN)

(72) Inventors: Renwei Guo, Beijing (CN); Xue Dong, Beijing (CN)

(73) Assignees: BOE TECHNOLOGY GROUP CO., LTD., Beijing (CN); BEIJING BOE OPTOELECTRONICS TECHNOLOGY CO., LTD., Beijing (CN)

( * ) Notice: Subject to any disclaimer, the term of this patent is extended or adjusted under 35 U.S.C. 154(b) by 0 days.

(21) Appl. No.: 14/916,738

(22) PCT Filed: Sep. 18, 2015

(86) PCT No.: PCT/CN2015/090014
§ 371 (c)(1),
(2) Date: Mar. 4, 2016

(87) PCT Pub. No.: WO2016/150126
PCT Pub. Date: Sep. 29, 2016

(65) Prior Publication Data
US 2017/0039995 A1      Feb. 9, 2017

(30) Foreign Application Priority Data

Mar. 23, 2015   (CN) .......................... 2015 1 0127678

(51) Int. Cl.
*G09G 5/10*      (2006.01)
*G09G 3/36*      (2006.01)
(Continued)

(52) U.S. Cl.
CPC ............... *G09G 5/10* (2013.01); *G09G 3/003* (2013.01); *G09G 3/2003* (2013.01); *G09G 3/36* (2013.01);
(Continued)

(58) Field of Classification Search
CPC ........ G09G 3/36; G09G 3/348; G09G 3/2003; G09G 3/20; G09G 5/10; G09G 2300/0452;
(Continued)

(56) References Cited

U.S. PATENT DOCUMENTS 8,933,959 B2 *   1/2015   Brown Elliott .... G02B 27/2214
                                                    345/589
9,230,465 B2 *   1/2016   Li ........................... G09G 3/003
(Continued)

FOREIGN PATENT DOCUMENTS

CN      101487938 A     7/2009
CN      102809826 A     12/2012
(Continued)

OTHER PUBLICATIONS

First Office Action of CN201510127678.0 dated Jul. 4, 2016, and English translation thereof.
(Continued)

*Primary Examiner* — Vijay Shankar
(74) *Attorney, Agent, or Firm* — Nath, Goldberg & Meyer; Joshua B. Goldberg

(57) ABSTRACT

A display driving method and a display driving device for driving a stereoscopic display device are provided. The display driving method comprises: respectively calculating color component of each sub-pixel in a plurality of the first pixel units and color component of each sub-pixel in a plurality of the second pixel units; and determining a sampling region of each sub-pixel, and determining a display
(Continued)

brightness of the sub-pixel in accordance with the color components of sub-pixels, which is the same color as the sub-pixel and in pixel units covered by the sampling region of the sub-pixel wherein the sampling region is a rhombic sampling region, and four vertexes of the rhombic sampling region are respectively midpoints of four lines in row and column directions connecting four central points of four sub-pixels, which are the same type as the sub-pixel, adjacent to the sub-pixel, in two columns adjacent to the sub-pixel.

20 Claims, 6 Drawing Sheets

(51) Int. Cl.
    *G09G 3/00*         (2006.01)
    *G09G 3/20*         (2006.01)
    *H04N 13/04*       (2006.01)
    *G09G 3/34*         (2006.01)

(52) U.S. Cl.
    CPC ......... *H04N 13/0422* (2013.01); *G09G 3/348* (2013.01); *G09G 2300/0404* (2013.01); *G09G 2300/0452* (2013.01); *G09G 2340/0457* (2013.01); *G09G 2360/16* (2013.01)

(58) Field of Classification Search
CPC ... G09G 2300/0404; G09G 2340/0457; G09G 2360/16
See application file for complete search history.

(56) References Cited

U.S. PATENT DOCUMENTS

| | | | |
|---|---|---|---|
| 2010/0118045 A1* | 5/2010 | Brown Elliott | G02B 27/2214 345/589 |
| 2013/0321246 A1 | 12/2013 | Li et al. | |
| 2014/0015864 A1 | 1/2014 | Kim | |
| 2014/0118824 A1 | 5/2014 | Hsieh et al. | |

FOREIGN PATENT DOCUMENTS

| | | |
|---|---|---|
| CN | 103152594 A | 6/2013 |
| CN | 103703411 A | 4/2014 |
| CN | 104299561 A | 1/2015 |
| CN | 104681001 A | 6/2015 |
| CN | 104766548 A | 7/2015 |

OTHER PUBLICATIONS

International Search Report for PCT/CN2015/090014 dated Dec. 15, 2015.

* cited by examiner

-- PRIOR ART --

DISPLAY DRIVING METHOD AND DISPLAY DRIVING DEVICE

This is a National Phase Application filed under 35 U.S.C. 371 as a national stage of PCT/CN2015/090014, filed Sep. 18, 2015, an application claiming the benefit of Chinese Application No. 201510127678.0, filed Mar. 23, 2015, the content of each of which is hereby incorporated by reference in its entirety.

FIELD OF THE INVENTION

The present invention belongs to the field of display technology, and particularly relates to a display driving method and a display driving device.

BACKGROUND OF THE INVENTION

FIG. 1 is a schematic diagram of a naked eye stereoscopic display device in the prior art. As shown in FIG. 1, all pixels 1 on a display panel 100 are used for displaying an image for left eye, and all pixels 2 are used for displaying an image for right eye. Light emitted by the pixels 1 and pixels 2 passes through a grating 200 and then enters the left eye and the right eye of a viewer to respectively form the image for left eye and the image for right eye. The image for left eye and the image for right eye are synthesized into a stereoscopic image in the human brain.

However, when the naked eye stereoscopic display is realized by utilizing the display device shown in FIG. 1, some of pixels in the display device are merely used for displaying the image for left eye while the others of pixels are merely used for displaying the image for right eye. As a result, the resolution of the naked eye stereoscopic display is reduced.

Hence, how to improve the resolution of the naked eye stereoscopic display device has become a technical problem urgently to be solved in the art.

SUMMARY OF THE INVENTION

In view of the problem of low resolution of a stereoscopic display device in the prior art, the present invention is directed to provide a display driving method and a display driving device which can improve the resolution of the stereoscopic display device.

According to one aspect of the present invention, a display driving method for driving a stereoscopic display device is provided, the stereoscopic display device including a pixel array and a grating provided on a light outgoing surface of the pixel array. The pixel array includes a plurality of first pixel units used for displaying a first view and a plurality of second pixel units used for displaying a second view, the plurality of the first pixel units and the plurality of the second pixel units being arranged in a matrix and the first pixel units and the second pixel units being arranged alternately both in a row direction and a column direction. The first pixel unit and the second pixel unit each include a plurality of sub-pixels of different colors provided in a same column. The grating includes a plurality of light shading regions and a plurality of light transmitting regions provided alternately both in the row direction and the column direction, each of the light shading regions being configured for shading a first region of the first pixel unit and a second region of the second pixel unit opposite to the first region of the first pixel unit which are adjacent in the row direction. The display driving method includes: respectively calculating a color component of each sub-pixel in the plurality of the first pixel units and a color component of each sub-pixel in the plurality of the second pixel units; and determining a sampling region of each sub-pixel, and determining a display brightness of the sub-pixel in accordance with the color components of sub-pixels, which is the same color as the sub-pixel and in pixel units covered by the sampling region of the sub-pixel, The sampling region is a rhombic sampling region, and four vertexes of the rhombic sampling region are respectively midpoints of four lines in row and column directions connecting four central points of four sub-pixels, which are the same type as the sub-pixel, adjacent to the sub-pixel, in two columns adjacent to the sub-pixel.

The term "sub-pixels of the same type" are sub-pixels, of the same color, among the pixel units belonging to a same view.

According to an embodiment of the present invention, after the step of determining the sampling region of each sub-pixel and determining the display brightness of the sub-pixel, the method may further include: inputting a signal to each sub-pixel in the first pixel units so that each sub-pixel in the first pixel units reach the determined display brightness; and inputting a signal to each sub-pixel in the second pixel units so that each sub-pixel in the second pixel units reach the determined display brightness.

According to an embodiment of the present invention, the grating may be any one of a black matrix grating, a liquid crystal grating and an electrowetting grating.

According to an embodiment of the present invention, each pixel unit may include three sub-pixels of different colors, i.e., a red sub-pixel, a blue sub-pixel and a green sub-pixel.

According to an embodiment of the present invention, the step of determining the sampling region of each sub-pixel and determining the display brightness of the sub-pixel may include: determining an overlapping area between the sampling region of each sub-pixel and each pixel unit among the plurality of the first pixel units and the plurality of the second pixel units, and color component of a sub-pixel, which is the same color as the sub-pixel and in each overlapped pixel unit; calculating a product of the overlapping area of the each overlapped pixel unit and the color component of the sub-pixel in the each overlapped pixel unit; and determining display brightness of the each sub-pixel according to a sum of the product and area of the sampling region of the each sub-pixel.

According to another aspect of the present invention, a display driving device for driving a stereoscopic display device is provided, the stereoscopic display device including a pixel array and a grating provided on a light outgoing surface of the pixel array. The pixel array includes a plurality of first pixel units used for displaying a first view and a plurality of second pixel units used for displaying a second view, the plurality of the first pixel units and the plurality of the second pixel units being arranged in a matrix and the first pixel units and the second pixel units being arranged alternately both in a row direction and a column direction, and each of the first pixel units and the second pixel units comprising a plurality of sub-pixels of different colors provided in a same column. The grating includes a plurality of light shading regions and a plurality of light transmitting regions provided alternately both in the row direction and the column direction, each of the light shading regions being configured for shading a first region of the first pixel unit and a second region of the second pixel unit opposite to the first region of the first pixel unit which are adjacent in the row direction. The display driving device includes: a pixel dividing unit, configured for respectively calculating a color component of each sub-pixel in the plurality of the first pixel units and a color component of each sub-pixel in the plurality of the second pixel units; and a display brightness determining unit, configured for determining a sampling region of each sub-pixel, and determining a display brightness of the sub-pixel in accordance with the color components of sub-pixels, which is the same color as the sub-pixel and in pixel units covered by the sampling region of the sub-pixel. The sampling region is a rhombic sampling region, and four vertexes of the rhombic sampling region are respectively midpoints of four lines in row and column directions connecting four central points of four sub-pixels, which are the same type as the sub-pixel, adjacent to the sub-pixel, in two columns adjacent to the sub-pixel.

According to an embodiment of the present invention, the display driving device may further include: an image generation unit, configured for inputting a signal to each sub-pixel in the first pixel units so that each sub-pixel in the first pixel units reach the determined display brightness; and inputting a signal to each sub-pixel in the second pixel units so that each sub-pixel in the second pixel units reach the determined display brightness.

According to an embodiment of the present invention, the grating may be any one of a black matrix grating, a liquid crystal grating and an electrowetting grating.

According to an embodiment of the present invention, each pixel unit may include three sub-pixels of different colors, i.e., a red sub-pixel, a blue sub-pixel and a green sub-pixel.

According to an embodiment of the present invention, the display brightness determining unit may be configured for: determining an overlapping area between the sampling region of each sub-pixel and each pixel unit among the plurality of the first pixel units and the plurality of the second pixel units, and color component of a sub-pixel, which is the same color as the sub-pixel and in each overlapped pixel unit; calculating a product of the overlapping area of the each overlapped pixel unit and the color component of the sub-pixel in the each overlapped pixel unit; and determining display brightness of the each sub-pixel according to a sum of the product and area of the sampling region of the each sub-pixel.

When the pixel array is driven by utilizing the display driving method and the display driving device according to the present invention, the display brightness outputting area when the pixel array displays a single image (for example, an image for left eye or an image for right eye) may be larger, so that a display panel including the pixel array can reach the display effect of a display panel having a higher resolution. Hence, during the stereoscopic display, a problem of resolution loss of the display device due to the shading of the grating may be avoided.

BRIEF DESCRIPTION OF THE DRAWINGS

The accompanying drawings are used for providing further understanding of the present invention, constitute a part of the specification, and are used for explaining the present invention together with implementations hereinafter but not intended to limit the present invention. In the drawings:

FIG. 3 is a schematic diagram when the pixel array in FIG. 2 is coordinated with a grating;

FIGS. 4 and 5 are respectively a first view and a second view divided from the pixel array shown in FIG. 2 by utilizing the gating shown in FIG. 3;

FIGS. 6-8 are respectively schematic distribution diagrams of red sub-pixels, blue sub-pixels and green sub-pixels in the first view shown in FIG. 4;

FIG. 9 is a schematic diagram of a sampling region of a red sub-pixel in the first view shown in FIG. 6;

FIG. 10 is a schematic diagram of calculating the display brightness of the red sub-pixel shown in FIG. 9; and FIGS. 11 and 12 are schematic diagrams of sampling regions of the sub-pixels of different colors in the first view.

DETAILED DESCRIPTION OF THE EMBODIMENTS

Figures 1, 2:
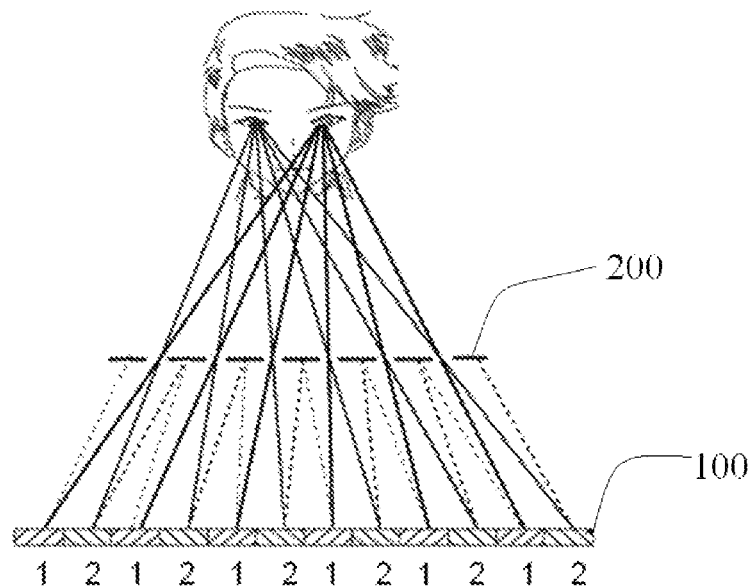
FIG. 1 is a schematic diagram of a naked eye stereoscopic display device in the prior art.
FIG. 2 is a schematic arrangement diagram of a pixel array according to an embodiment of the present invention.

In order to make those skilled in the art understand the technical solution of the present invention better, the present invention will be further described below in detail in conjunction with the accompanying drawings and specific implementations.

According to an embodiment of the present invention, a display driving method used for driving a stereoscopic display device is provided. The stereoscopic display device includes a pixel array and a grating provided on a light outgoing surface of the pixel array.

Figures 3, 4:
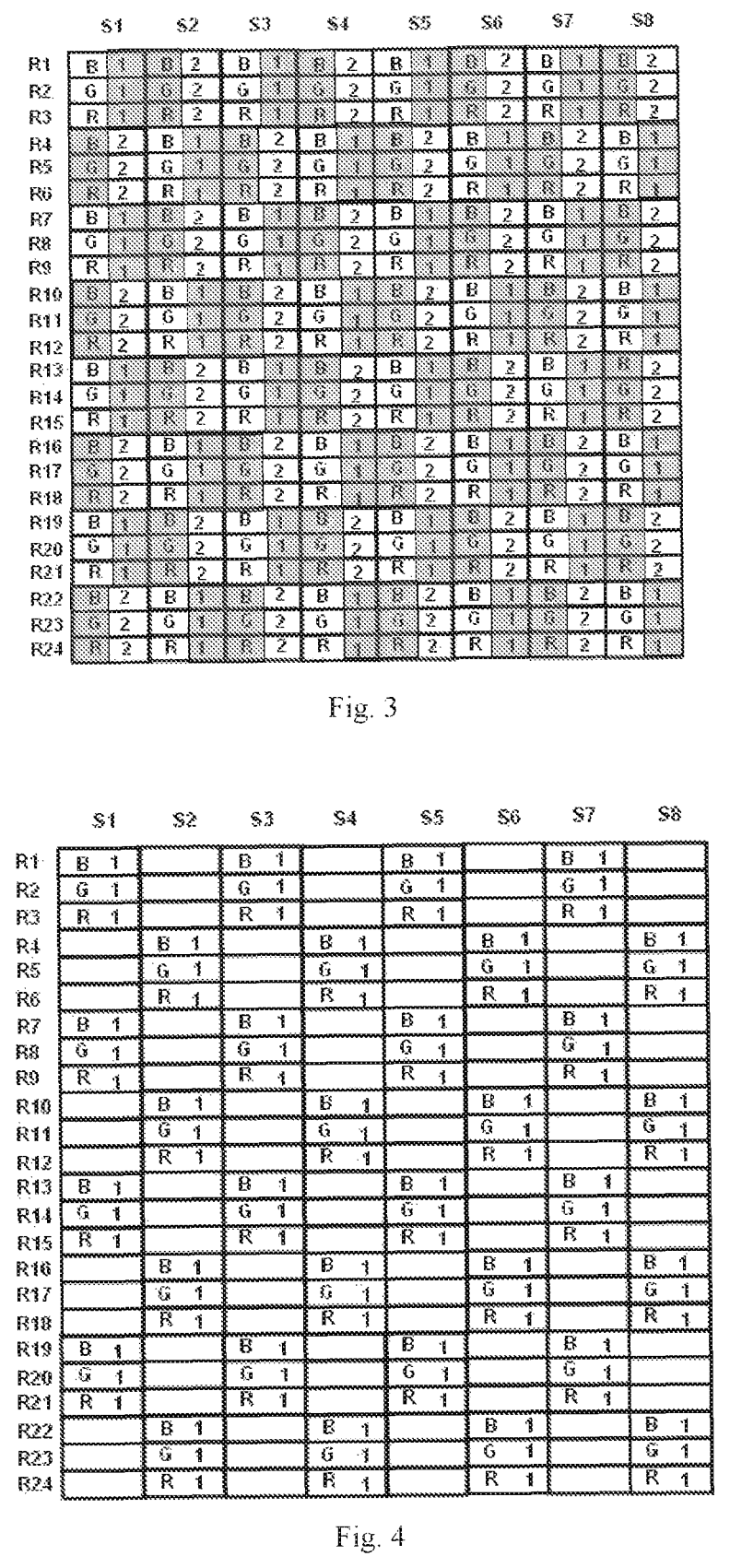

FIG. 2 is a schematic arrangement diagram of the pixel array according to the embodiment of the present invention, and FIG. 3 is a schematic diagram when the pixel array in FIG. 2 is coordinated with the grating.

As shown in FIG. 2, the pixel array includes a plurality of first pixel units used for displaying a first view and a plurality of second pixel units used for displaying a second view, the plurality of the first pixel units and the plurality of the second pixel units being arranged in a matrix and the first pixel units and the second pixel units being arranged alternately both in a row direction and a column direction. The first pixel units and the second pixel units each include a plurality of sub-pixels of different colors provided in a same column.

As shown in FIG. 3, the grating includes a plurality of light shading regions and a plurality of light transmitting regions provided alternately both in the row direction and the column direction, and each of the light shading regions is configured for shading a first region of a first pixel unit and a second region of a second pixel unit opposite to the first region of the first pixel unit which are adjacent in the row direction. As the structure of the grating corresponds to the pixel unit and the light shading regions and light transmitting regions of the grating are arranged alternately both in the row direction and the column direction, and the grating is thus shaped like a chessboard, the grating may be called as a chessboard grating.

The display driving method according to the embodiment of the present invention may include steps of:

respectively calculating a color component of each sub-pixel in the plurality of the first pixel units and a color component of each sub-pixel in the plurality of the second pixel units; and determining a sampling region of each sub-pixel, and determining a display brightness of the sub-pixel in accordance with the color components, of the same color as the sub-pixel, in pixel units covered by the sampling region corresponding to the sub-pixel.

The sampling region may be a rhombic sampling region, and four vertexes of the rhombic sampling region are respectively midpoints of lines connecting centers of four sub-pixels of the same type, adjacent to the sub-pixel, in columns adjacent to the sub-pixel, the display brightness of which is to be determined.

Figures 5, 6:
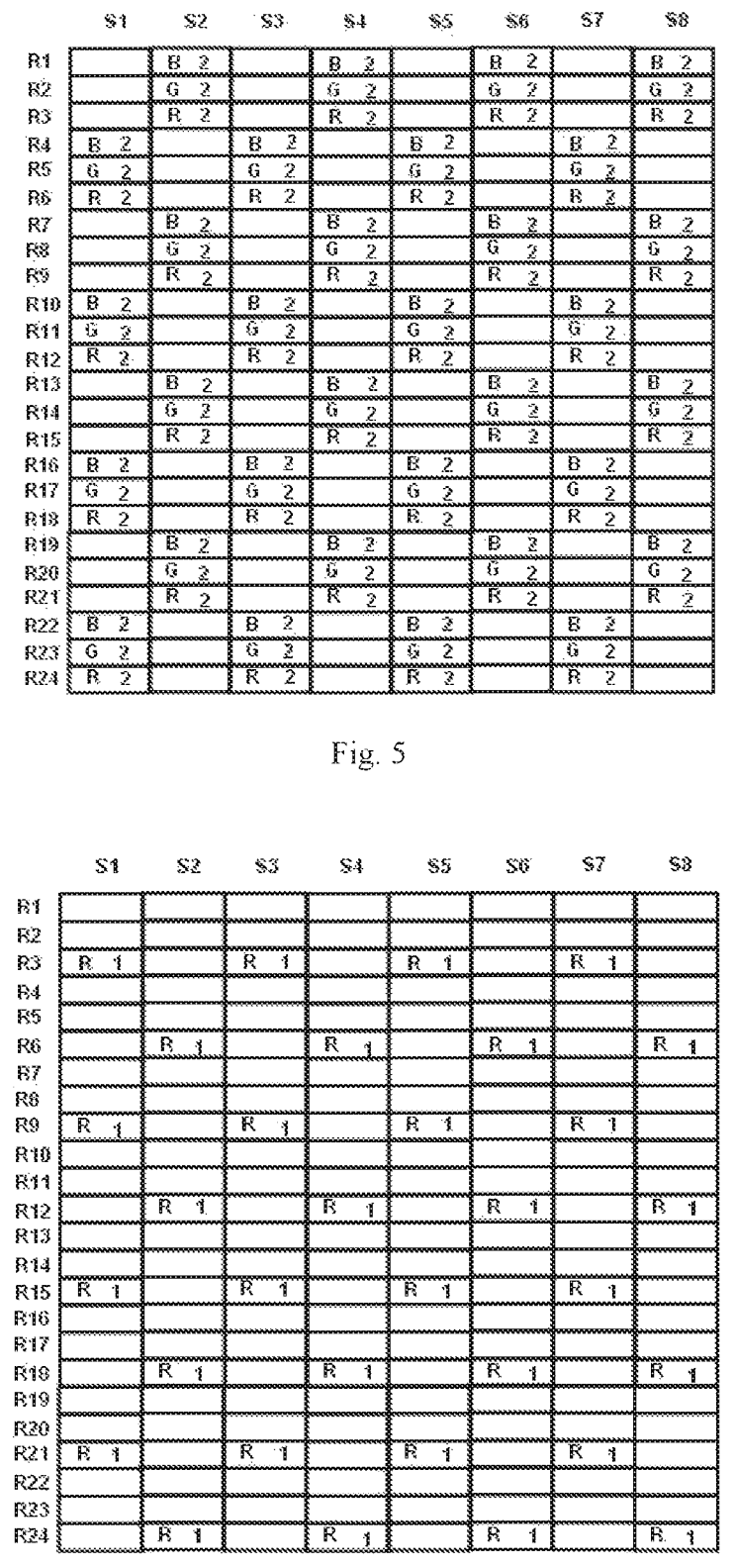

Specifically, in the stereoscopic display device, the grating divides an image to be displayed into the first view corresponding to a left eye and the second view corresponding to a right eye, referring to FIGS. 4 and 5. The color components of the subs-pixels in each of the plurality of first pixel units used for displaying the first view is determined first. The first pixel unit may include a red sub-pixel, a blue sub-pixel and a green sub-pixel, and hence, it is required to determine the color components of the red sub-pixel, the green sub-pixel and the blue sub-pixel in each of the first pixel units. Additionally, the color components of the subs-pixels in each of the plurality of second pixel units used for displaying the second view is determined in the same way.

The display brightness of the sub-pixels is determined by dividing the sampling region for each sub-pixel. The actual display brightness of each sub-pixel may include a part of the display brightness of a view to be displayed corresponding to the sub-pixel and a part of the display brightness of sub-pixels, of the same type, adjacent to the sub-pixel. Hence, when one sub-pixel outputs the display brightness, the display brightness of the sub-pixels of the same type around the sub-pixel is shared, so that the display device including the pixel array can reach the display effect of a display device having a higher resolution, and much information may be output by the sharing between the sub-pixels.

Specifically, in the step of determining the sampling region of each sub-pixel and determining the display brightness of the sub-pixel, for each sub-pixel, an overlapping area between the sampling region of the sub-pixel and each pixel unit among the plurality of the first pixel units and the plurality of the second pixel units and the color components, of the same color as the sub-pixel, in the overlapped pixel units are determined; for each overlapped pixel unit, a product of the overlapping area and the corresponding color component is calculated; and the display brightness of the sub-pixel is determined according to the sum of the products and the area of the sampling region.

The display driving method according to the embodiment of the present invention may further include steps of:

inputting a signal to each sub-pixel in the first pixel units so that all sub-pixels reach the determined display brightness to form the first view; and inputting a signal to each sub-pixel in the second pixel units so that all sub-pixels reach the determined display brightness to form the second view.

As shown in FIG. 2, the shown pixel array includes eight columns (S1-S8) and 24 rows (R1-R24) of sub-pixels, wherein sub-pixels B1, G1 and R1 constitute the first pixel unit and sub-pixels B2, G2 and R2 constitute the second pixel unit (as shown in a dashed frame in FIG. 2), and the first pixel units and the second pixel units are arranged alternately both in the row direction and the column direction. The first pixel units correspond to the first view (i.e., the view for left eye), and the second pixel units correspond to the second view (i.e., the view for right eye). The first pixel units and the second pixel units may each include three rectangular sub-pixels arranged in a column, i.e., blue sub-pixels B1 and B2, green sub-pixels G1 and G2 and red sub-pixels R1 and R2. It is to be noted that, for clearer description, pixel units in the pixel array are divided into the first pixel units and the second pixel units, but the first pixel units and the second pixel units are essentially the same pixel units and just different in name.

As shown in FIG. 3, the shown grating includes light shading regions and light transmitting regions. Each of the light shading regions (shadow as shown in FIG. 3) shades a first region of the first pixel unit and a second region of the second pixel unit adjacent to, in the row direction, and opposite to the first region of the first pixel unit. In order to better realize the naked eye stereoscopic display effect, each of the light shading regions may shade a half region of the first pixel unit and a half region of the second pixel unit adjacent to, in the row direction, and opposite to the shaded half region of the first pixel unit. As shown in FIG. 3, each of the light shading regions shades a right half region of the first pixel unit and a left half region of the second pixel, which are adjacent to each other in the row direction. At this time, after the light from a backlight source is transmitted through the grating, the left eye can see only the first view presented by the first pixel units, as shown in FIG. 4; and the right eye can see only the second view presented by the second pixel units, as shown in FIG. 5. In this way, the stereoscopic display is realized.

Figures 7, 8:
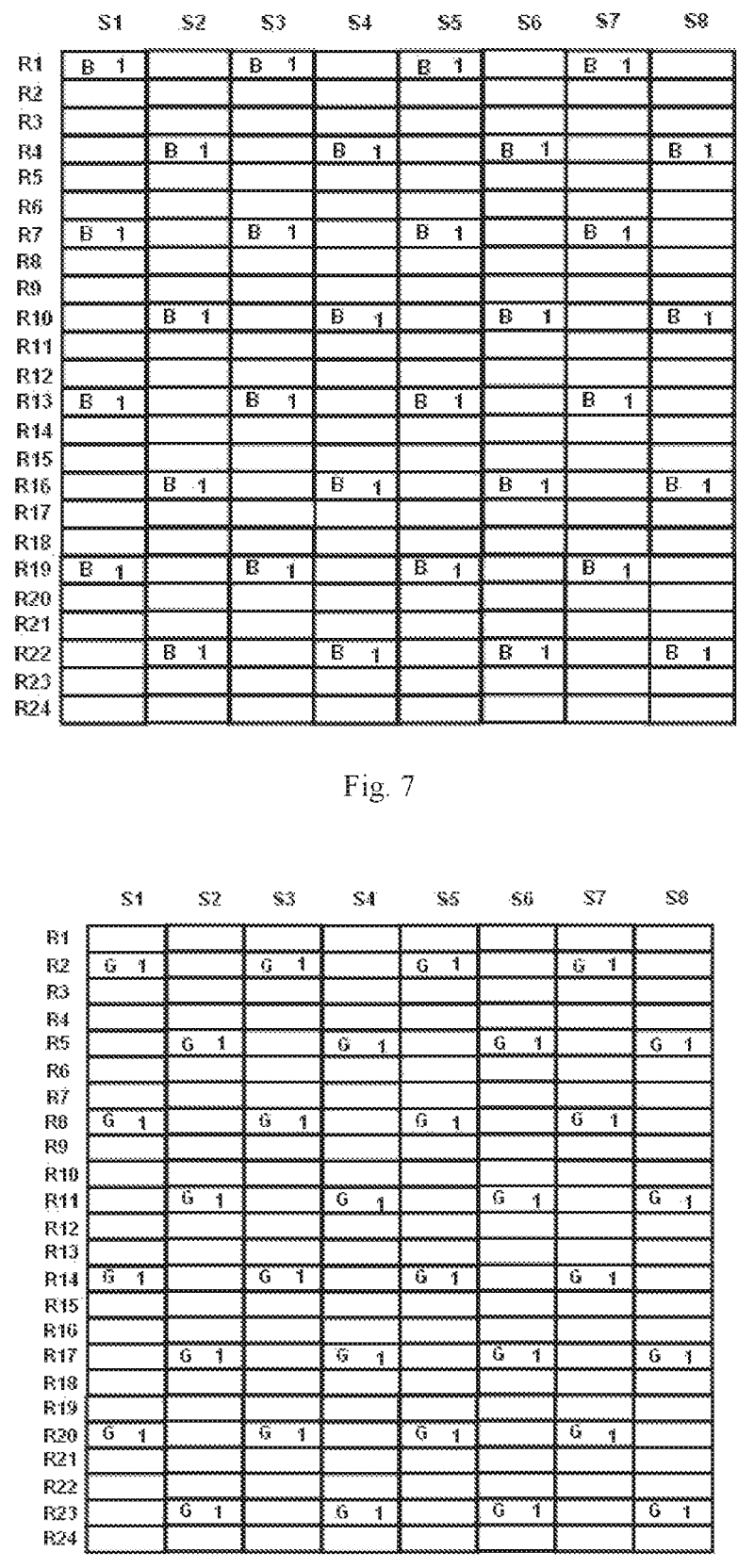

As shown in FIG. 4, each of the first pixel units includes a blue sub-pixel B1, a green sub-pixel G1 and a red sub-pixel R1 successively arranged in the column direction. FIGS. 6-8 are respectively schematic distribution diagrams of the red sub-pixels R1, the blue sub-pixels B1 and the green sub-pixels G1 in the first view shown in FIG. 4. For ease of description, the description hereinafter is given by taking the sampling region of one red sub-pixel R1 as an example.

Figures 9, 10:
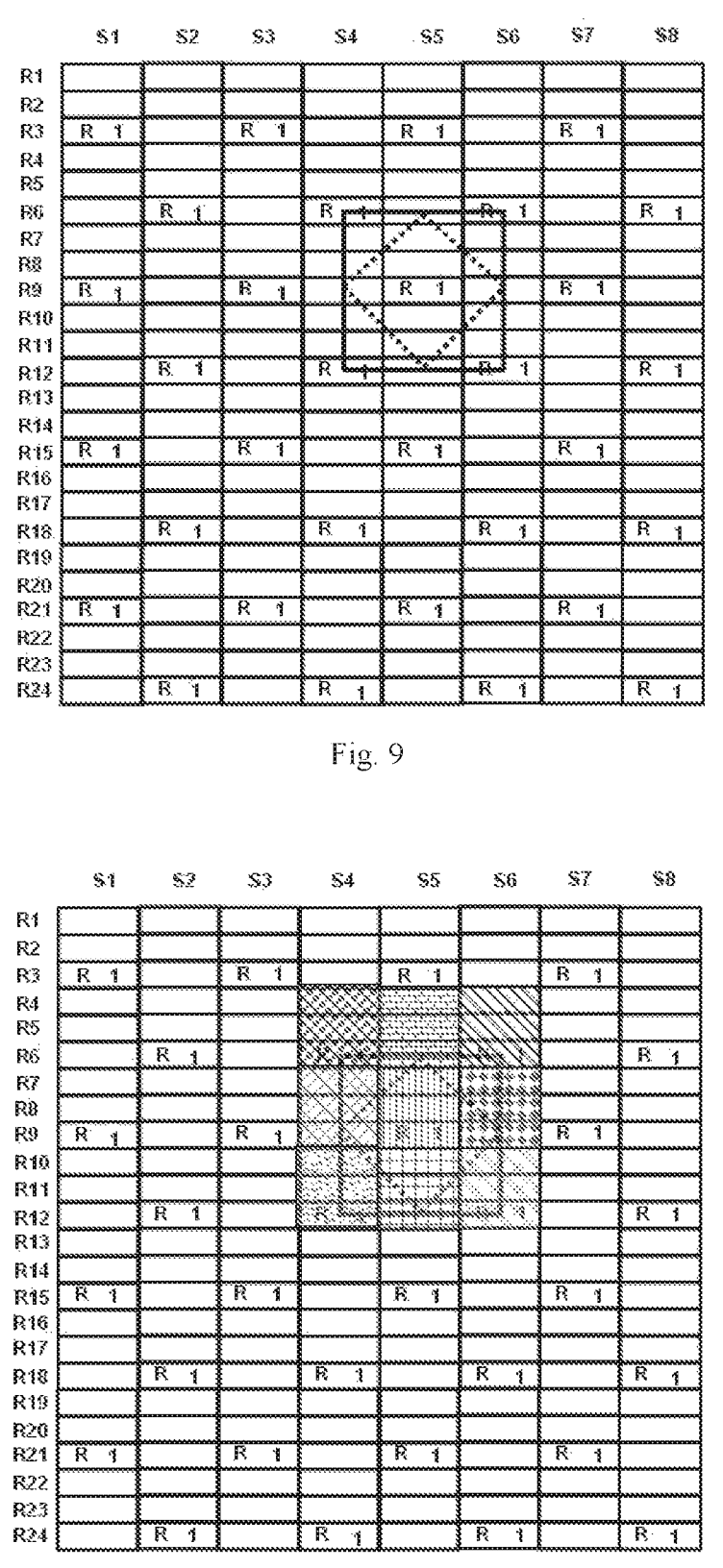

FIG. 9 is a schematic diagram of the sampling region of the red sub-pixel R1 in the first view shown in FIG. 6.

As shown in FIG. 9, in columns adjacent to the red sub-pixel R1 in the fifth column and the ninth row (S5R9) (i.e., the fourth column (S4) and the sixth column (S6)), the four sub-pixels, which are the same type as and adjacent to the red sub-pixel R1, are respectively red sub-pixels R1 in S4R6, S6R6, S4R12 and S6R12. The centers of the four red sub-pixels R1 are connected (as shown in a rectangular solid frame in FIG. 9), midpoints of the connection lines are regarded as four vertexes of the sampling region of the red sub-pixel R1 in S5R9, thereby constituting the sampling region of the red sub-pixel R1 in S5R9 (as shown in a dashed frame in FIG. 9). The sampling region may be a rhombic sampling region.

According to the aforementioned method, the sampling region of each red sub-pixel R1 in the first view may be determined. Additionally, sampling regions of each blue sub-pixel B1 and each green sub-pixel G1 may be further determined.

FIG. 10 is a schematic diagram of calculating the display brightness of the red sub-pixel as shown in FIG. 9.

As shown in FIG. 10, the sampling region of the red sub-pixel R1 in S5R9 spans nine (3×3) pixel units in both of the row direction and the column direction, including five first pixel units and four second pixel units. The five first pixel units are respectively S4R4/S4R5/S4R6, S4R10/S4R11/S4R12, S6R4/S6R5/S6R6, S6R10/S6R11/S6R12 and S5R7/S5R8/S5R9; and the four second pixel units are respectively S4R7/S4R8/S4R9, S6R7/S6R8/S6R9, S5R4/S5R5/S5R6 and S5R10/S5R11/S5R12. The sampling region of the red sub-pixel R1 in S5R9 partially overlaps three first pixel units S4R10/S4R11/S4R12, S5R7/S5R8/S5R9 and S6R10/S6R11/S6R12 and four second pixel units S4R7/S4R8/S4R9, S6R7/S6R8/S6R9, S5R4/S5R5/S5R6 and S5R10/S5R11/S5R12. For the red sub-pixel R1 in S5R9, the overlapping area between the sampling region thereof and each overlapped pixel unit and the color components of red sub-pixels R1 in the overlapped pixel units, that is, the color components of the red sub-pixels R1 in S4R12, S5R9 and S6R12 in the first pixel units and the color components of the red sub-pixels R1 in S4R9, S6R9, S5R6 and S5R12 in the second pixel units, may be determined. Then, for each overlapped pixel unit, a product of the overlapping area and the color component of the corresponding red sub-pixel R1 is calculated, and the display brightness of the red sub-pixel R1 in S5R9 is determined according to the sum of the products and the area of the sampling region.

Figures 11, 12:
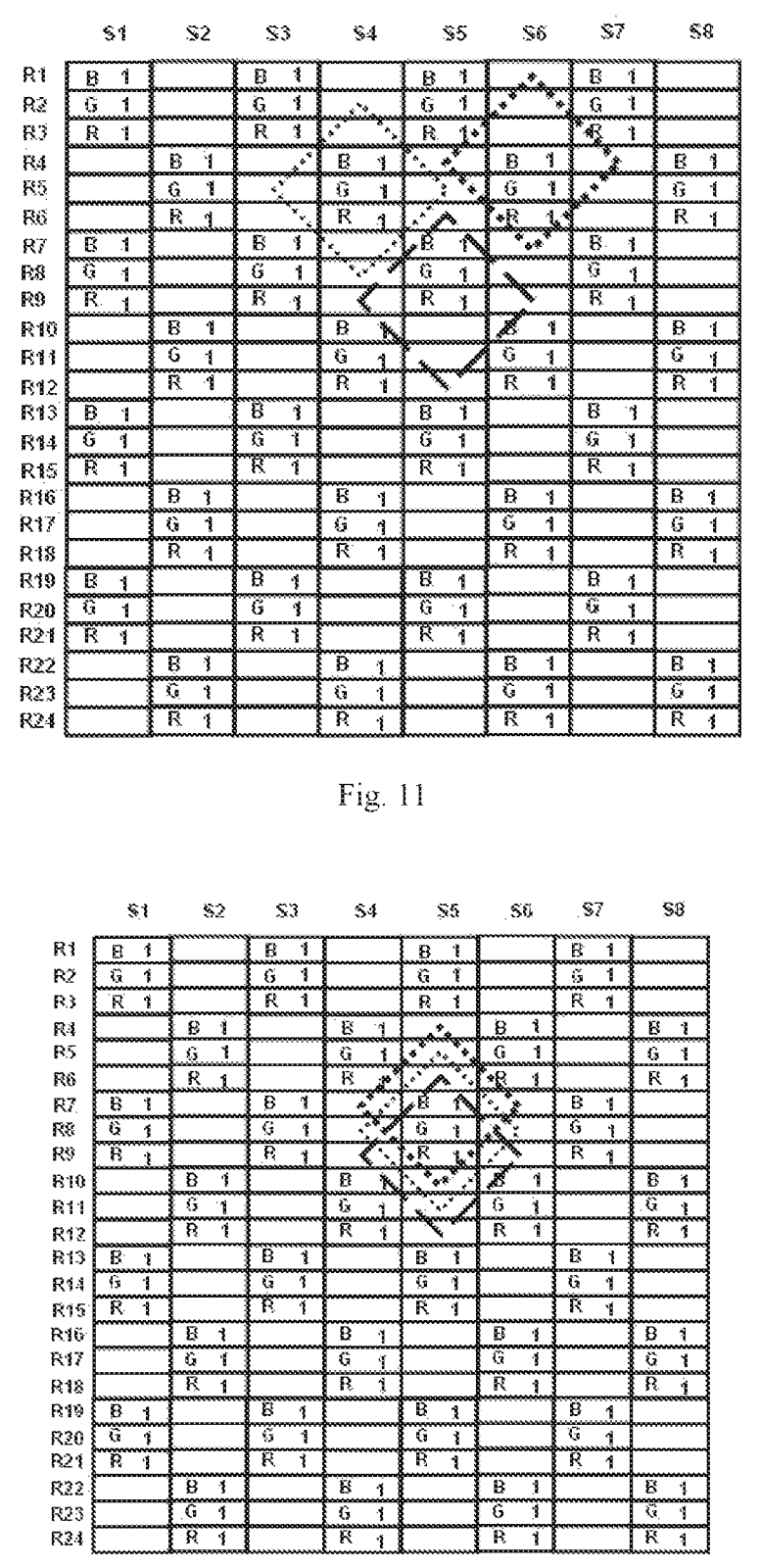

FIGS. 1 and 12 are schematic diagrams of sampling regions of the sub-pixels of different colors in the first view.

As shown in FIG. 11, the sampling regions of different colors in the same view can be flexibly controlled. Three sampling regions as shown in FIG. 11 are respectively a sampling region of a green sub-pixel G1 in S4R5, a sampling region of a blue sub-pixel B1 in S6R4 and the sampling region of the red sub-pixels R1 in S5R9 in the first view. Additionally, as shown in FIG. 12, the sampling regions of the red sub-pixel R1, the green sub-pixel G1 and the blue sub-pixel B1 in the same first pixel unit in the first view partially overlap each other. Similarly, the same is applicable to the second view, which will not be repeated herein.

It is to be noted that, in this embodiment, the description is given by taking the first pixel unit and the second pixel unit each including three sub-pixels of different colors, i.e., the red sub-pixel, the blue sub-pixel and the green sub-pixel, as an example, but the present invention is not limited thereto. Each of the first pixel unit and the second pixel unit may also include four or more sub-pixels of different colors, and additionally, the colors of the sub-pixels are not limited to red, blue and green.

According to the embodiment of the present invention, the grating may be (but not limited to) any one of a black matrix grating, a liquid crystal grating and an electrowetting grating.

According to other embodiments of the present invention, a display driving device for driving a stereoscopic display device is provided to execute the display driving method according to the present invention. The display driving device includes: a pixel dividing unit, configured for respectively calculating the color component of each sub-pixel in the plurality of the first pixel units for displaying the first view and the color component of each sub-pixel in the plurality of the second pixel units for displaying the second view; and a display brightness determining unit, configured for determining a sampling region of each sub-pixel, and determining the display brightness of the sub-pixel in accordance with the color components, of the same color as the sub-pixel, in pixel units covered by the sampling region corresponding to the sub-pixel.

According to the embodiment of the present invention, the display brightness determining unit may be used for: for each sub-pixel, determining the overlapping area of the sampling region thereof and each pixel unit among the plurality of the first pixel units and the plurality of the second pixel units, and the color components, of the same color as the sub-pixel, in the overlapped pixel units; for each overlapped pixel unit, calculating a product of the overlapping area and the corresponding color component; and determining the display brightness of the sub-pixel according to a sum of the products and the area of the sampling region.

According to the embodiment of the present invention, the stereoscopic display device may further include: an image generation unit, configured for inputting a signal to each sub-pixel in the first pixel units so that all sub-pixels reach the determined display brightness to form the first view, and inputting a signal to each sub-pixel in the second pixel units so that all sub-pixels reach the determined display brightness to form the second view.

It may be understood that the aforementioned implementations are merely exemplary implementations used for describing the principle of the present invention, but the present invention is not limited thereto. For a person of ordinary skill in the art, various variations and improvements may be made without departing from the spirit and essence of the present invention, and such variations and improvements should also be regarded as falling into the protection scope of the present invention.

The invention claimed is:

1. A display driving method for driving a stereoscopic display device, the stereoscopic display device comprising a pixel array and a grating provided on a light outgoing surface of the pixel array,
    the pixel array comprising a plurality of first pixel units used for displaying a first view and a plurality of second pixel units used for displaying a second view, the plurality of the first pixel units and the plurality of the second pixel units being arranged in a matrix and the first pixel units and the second pixel units being arranged alternately both in a row direction and a column direction, and each of the first pixel units and the second pixel units comprising a plurality of sub-pixels of different colors provided in a same column,
    the grating comprising a plurality of light shading regions and a plurality of light transmitting regions provided alternately both in the row direction and the column direction, each of the light shading regions being configured for shading a first region of the first pixel unit and a second region of the second pixel unit opposite to the first region of the first pixel unit which are adjacent in the row direction,
    the display driving method comprises steps of:
    respectively calculating a color component of each sub-pixel in the plurality of the first pixel units and a color component of each sub-pixel in the plurality of the second pixel units; and
    determining a sampling region of each sub-pixel, and determining a display brightness of the sub-pixel in accordance with the color components of sub-pixels, which is the same color as the sub-pixel and in pixel units covered by the sampling region of the sub-pixel,
    wherein the sampling region is a rhombic sampling region, and four vertexes of the rhombic sampling region are respectively midpoints of four lines in row and column directions connecting four central points of four sub-pixels, which are the same type as the sub-pixel, adjacent to the sub-pixel, in two columns adjacent to the sub-pixel.

2. The display driving method according to claim 1, after the step of determining the sampling region of each sub-pixel and determining the display brightness of the sub-pixel, further comprising:
    inputting a signal to each sub-pixel in the first pixel units so that each sub-pixel in the first pixel units reach the determined display brightness; and
    inputting a signal to each sub-pixel in the second pixel units so that each sub-pixel in the second pixel units reach the determined display brightness.

3. The display driving method according to claim 1, wherein the grating is any one of a black matrix grating, a liquid crystal grating and an electrowetting grating.

4. The display driving method according to claim 1, wherein each pixel unit comprises three sub-pixels of different colors including a red sub-pixel, a blue sub-pixel and a green sub-pixel.

5. The display driving method according to claim 1, wherein the step of determining the sampling region of each sub-pixel and determining the display brightness of the sub-pixel comprises:
   determining an overlapping area between the sampling region of each sub-pixel and each pixel unit among the plurality of the first pixel units and the plurality of the second pixel units, and color component of a sub-pixel, which is the same color as the sub-pixel and in each overlapped pixel unit;
   calculating a product of the overlapping area of the each overlapped pixel unit and the color component of the sub-pixel in the each overlapped pixel unit; and
   determining display brightness of the each sub-pixel according to a sum of the product and area of the sampling region of the each sub-pixel.

6. The display driving method according to claim 2, wherein the grating is any one of a black matrix grating, a liquid crystal grating and an electrowetting grating.

7. The display driving method according to claim 2, wherein each pixel unit comprises three sub-pixels of different colors including a red sub-pixel, a blue sub-pixel and a green sub-pixel.

8. The display driving method according to claim 2, wherein the step of determining the sampling region of each sub-pixel and determining the display brightness of the sub-pixel comprises:
   determining an overlapping area between the sampling region of each sub-pixel and each pixel unit among the plurality of the first pixel units and the plurality of the second pixel units, and color component of a sub-pixel, which is the same color as the sub-pixel and in each overlapped pixel unit;
   calculating a product of the overlapping area of the each overlapped pixel unit and the color component of the sub-pixel in the each overlapped pixel unit; and
   determining display brightness of the each sub-pixel according to a sum of the product and area of the sampling region of the each sub-pixel.

9. The display driving method according to claim 3, wherein the step of determining the sampling region of each sub-pixel and determining the display brightness of the sub-pixel comprises:
   determining an overlapping area between the sampling region of each sub-pixel and each pixel unit among the plurality of the first pixel units and the plurality of the second pixel units, and color component of a sub-pixel, which is the same color as the sub-pixel and in each overlapped pixel unit;
   calculating a product of the overlapping area of the each overlapped pixel unit and the color component of the sub-pixel in the each overlapped pixel unit; and
   determining display brightness of the each sub-pixel according to a sum of the product and area of the sampling region of the each sub-pixel.

10. A display driving device for driving a stereoscopic display device, the stereoscopic display device comprising a pixel array and a grating provided on a light outgoing surface of the pixel array,
   the pixel array comprising a plurality of first pixel units used for displaying a first view and a plurality of second pixel units used for displaying a second view, the plurality of the first pixel units and the plurality of the second pixel units being arranged in a matrix and the first pixel units and the second pixel units being arranged alternately both in a row direction and a column direction, and each of the first pixel units and the second pixel units comprising a plurality of sub-pixels of different colors provided in a same column,
   the grating comprising a plurality of light shading regions and a plurality of light transmitting regions provided alternately both in the row direction and the column direction, each of the light shading regions being configured for shading a first region of the first pixel unit and a second region of the second pixel unit opposite to the first region of the first pixel unit which are adjacent in the row direction,
   the display driving device comprising:
   a pixel dividing unit, configured for respectively calculating a color component of each sub-pixel in the plurality of the first pixel units and a color component of each sub-pixel in the plurality of the second pixel units; and
   a display brightness determining unit, configured for determining a sampling region of each sub-pixel, and determining a display brightness of the sub-pixel in accordance with the color components of sub-pixels, which is the same color as the sub-pixel and in pixel units covered by the sampling region of the sub-pixel,
   wherein the sampling region is a rhombic sampling region, and four vertexes of the rhombic sampling region are respectively midpoints of four lines in row and column directions connecting four central points of four sub-pixels, which are the same type as the sub-pixel, adjacent to the sub-pixel, in two columns adjacent to the sub-pixel.

11. The display driving device according to claim 10, further comprising:
   an image generation unit, configured for inputting a signal to each sub-pixel in the first pixel units so that each sub-pixel in the first pixel units reach the determined display brightness; and inputting a signal to each sub-pixel in the second pixel units so that each sub-pixel in the second pixel units reach the determined display brightness.

12. The display driving device according to claim 10, wherein the grating is any one of a black matrix grating, a liquid crystal grating and an electrowetting grating.

13. The display driving device according to claim 10, wherein each pixel unit comprises three sub-pixels of different colors including a red sub-pixel, a blue sub-pixel and a green sub-pixel.

14. The display driving device according to claim 10, wherein the display brightness determining unit is configured for:
   determining an overlapping area between the sampling region of each sub-pixel and each pixel unit among the plurality of the first pixel units and the plurality of the second pixel units, and color component of a sub-pixel, which is the same color as the sub-pixel and in each overlapped pixel unit;
   calculating a product of the overlapping area of the each overlapped pixel unit and the color component of the sub-pixel in the each overlapped pixel unit; and
   determining display brightness of the each sub-pixel according to a sum of the product and area of the sampling region of the each sub-pixel.

15. The display driving device according to claim 11, wherein the grating is any one of a black matrix grating, a liquid crystal grating and an electrowetting grating.

16. The display driving device according to claim 11, wherein each pixel unit comprises three sub-pixels of different colors including a red sub-pixel, a blue sub-pixel and a green sub-pixel.

17. The display driving device according to claim 12, wherein each pixel unit comprises three sub-pixels of different colors including a red sub-pixel, a blue sub-pixel and a green sub-pixel.

18. The display driving device according to claim 11, wherein the display brightness determining unit is configured for:
   determining an overlapping area between the sampling region of each sub-pixel and each pixel unit among the plurality of the first pixel units and the plurality of the second pixel units, and color component of a sub-pixel, which is the same color as the sub-pixel and in each overlapped pixel unit;
   calculating a product of the overlapping area of the each overlapped pixel unit and the color component of the sub-pixel in the each overlapped pixel unit; and
   determining display brightness of the each sub-pixel according to a sum of the product and area of the sampling region of the each sub-pixel.

19. The display driving device according to claim 12, wherein the display brightness determining unit is configured for:
   determining an overlapping area between the sampling region of each sub-pixel and each pixel unit among the plurality of the first pixel units and the plurality of the second pixel units, and color component of a sub-pixel, which is the same color as the sub-pixel and in each overlapped pixel unit;
   calculating a product of the overlapping area of the each overlapped pixel unit and the color component of the sub-pixel in the each overlapped pixel unit; and
   determining display brightness of the each sub-pixel according to a sum of the product and area of the sampling region of the each sub-pixel.

20. The display driving device according to claim 13, wherein the display brightness determining unit is configured for:
   determining an overlapping area between the sampling region of each sub-pixel and each pixel unit among the plurality of the first pixel units and the plurality of the second pixel units, and color component of a sub-pixel, which is the same color as the sub-pixel and in each overlapped pixel unit;
   calculating a product of the overlapping area of the each overlapped pixel unit and the color component of the sub-pixel in the each overlapped pixel unit; and
   determining display brightness of the each sub-pixel according to a sum of the product and area of the sampling region of the each sub-pixel.

* * * * *